(12) United States Patent
Hagl

(10) Patent No.: US 7,020,575 B2
(45) Date of Patent: Mar. 28, 2006

(54) METHOD AND DEVICE FOR DETERMINING POSITION

(75) Inventor: Rainer Hagl, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/491,522

(22) PCT Filed: Oct. 1, 2002

(86) PCT No.: PCT/EP02/10974

§ 371 (c)(1),
(2), (4) Date: Mar. 31, 2004

(87) PCT Pub. No.: WO03/031916

PCT Pub. Date: Apr. 17, 2003

(65) Prior Publication Data

US 2004/0189496 A1 Sep. 30, 2004

(30) Foreign Application Priority Data

Oct. 4, 2001 (DE) ................................. 101 49 174

(51) Int. Cl.
*G01C 17/00* (2006.01)

(52) U.S. Cl. ...................................... 702/150; 356/623
(58) Field of Classification Search ................ 702/150; 356/623; 341/111; 250/231.13
See application file for complete search history.

(56) References Cited

U.S. PATENT DOCUMENTS

| 4,882,529 | A | 11/1989 | Kobari et al. |
| 5,406,077 | A | 4/1995 | Aoki et al. |
| 5,530,550 | A * | 6/1996 | Nikoonahad et al. ....... 356/623 |
| 2002/0041241 | A1* | 4/2002 | Oberhauser .................. 341/111 |
| 2004/0026608 | A1* | 2/2004 | Drescher et al. ....... 250/231.13 |

FOREIGN PATENT DOCUMENTS

| DE | 44 10 955 A1 | 10/1994 |
| EP | 0 293 479 A1 | 12/1988 |
| EP | 0 661 543 A1 | 7/1995 |

OTHER PUBLICATIONS

D. Mann, "Verbesserte Auswertung von Inkrementellen Gebersystemen durch Overcampling," published at ISW Lageregelseminar entitled "Fortschritte in der Regelungs" held Nov. 13-14, 1998, pp. 1-20.

* cited by examiner

*Primary Examiner*—Michael Nghiem
*Assistant Examiner*—Xiuqin Sun
(74) *Attorney, Agent, or Firm*—Brinks Hofer Gilson & Lione

(57) ABSTRACT

A position measuring device including a detector unit that generates position-dependent scanning signals and a transmitting unit that transmits instantaneous values of the position-dependent scanning signals in a preset scanning clock pulse. A processing unit that establishes a resulting measured position value by filtering instantaneous values of several scanning clock pulses and an interface which, on the basis of a transmission clock pulse transmits the resulting measured position value to a sequential electronic unit via a serial data line.

17 Claims, 3 Drawing Sheets

METHOD AND DEVICE FOR DETERMINING POSITION

Applicant claims, under 35 U.S.C. §§ 120 and 365, the benefit of priority of the filing date of Oct. 1, 2002 of a Patent Cooperation Treaty patent application, copy attached, Serial Number PCT/EP02/10974, filed on the aforementioned date, the entire contents of which are incorporated herein by reference, wherein Patent Cooperation Treaty patent application Serial Number PCT/EP02/10974 was not published under PCT Article 21(2) in English.

Applicant claims, under 35 U.S.C. § 119, the benefit of priority of the filing date of Oct. 4, 2001 of a German patent application, copy attached, Serial Number 101 49 174.3, filed on the aforementioned date, the entire contents of which are incorporated herein by reference.

BACKGROUND OF THE INVENTION

1. Field of the Invention

The present invention relates to a method for position determination in a position measuring device, as well as to a position measuring device for executing the method.

2. Description of the Related Art

Position measuring devices are increasingly required to meet the requirements of highly dynamic drive mechanism regulations. Also, direct drive mechanisms, with which a high regulating quality can be achieved, are increasingly being employed. A requirement for this is an accurate and dynamic position and velocity determination. At present, the position determination is preponderantly based on incremental or absolute angle encoders or linear measurement encoders. Position information is generated in interpolation circuits by the amplitude information contained in the sinusoidal scanning signals, which has a many times higher resolution than the graduation period of the position measuring device. As a rule, the velocity is determined by time-discrete differentiation of the position, and the acceleration by further differentiation of the velocity.

An article by D. Mann, entitled "Verbesserte Auswertung von inkrementalen Gebersystemen durch Oversampling" [Improved Evaluation of Incremental Encoder Systems by Oversampling], is found in the source materials of the seminar on position regulation "Fortschritte in der Regelungs- und Antriebstechnik" [Advances in Regulating and Drive Technology] of Nov. 13 and 14, 1998. In this article it is stated that the position determination, as well as the velocity determination, can by improved by oversampling. In this case, oversampling is defined by adding up all position values in the course of a scanning step of the regulator (sequential electronic device), and subsequent division by their number. From FIG. 11 and FIG. 15 it can be determined that the position measuring device itself only provides the analog scanning signals A and B, and further processing, including the oversampling process, takes place in the sequential electronic device. However, the transmission of analog position measuring values is relatively susceptible to interference and noise, and the high number of lines between the position measuring device and the sequential electronic device is also negative.

SUMMARY AND OBJECTS OF THE INVENTION

It is an object of the present invention to disclose a method and a position measuring device by which a qualitatively good and dependable regulation on the basis of the position measuring values provided by the position measuring device via a serial data line is made possible.

This object is attained by a method for determining a position in a position measuring device, the method including generating position-dependent scanning signals by a detector unit of a position measuring device and transmitting instantaneous values of the scanning signals in a preset scanning clock pulse. Establishing a position value assigned to the scanning clock pulse from the transmitted instantaneous values of the scanning signals. Establishing a resulting measured position value from a position value by filtering and serially transmitting the resulting measured position value to a sequential electronic device.

The above object is furthermore attained by a position measuring device including a detector unit that generates position-dependent scanning signals and a transmitting unit that transmits instantaneous values of the position-dependent scanning signals in a preset scanning clock pulse. A processing unit that establishes a resulting measured position value by filtering instantaneous values of several scanning clock pulses and an interface which, on the basis of a transmission clock pulse transmits the resulting measured position value to a sequential electronic unit via a serial data line.

A reduction of lines between the position measuring device and the sequential electronic device can be obtained by the present invention in that a serial interface with high transmission rates is used. It is possible to improve the positioning behavior, the synchronous running behavior, the interference behavior, as well as the noise generation, at the drive mechanisms.

The serial interface can also be used for transmitting time-critical data, such as parameters of the position measuring device, monitoring data or diagnostic data, for example.

In accordance with the present invention, the actual values of the position, and possibly of the acceleration, are already scanned in the position measuring device at high clock frequencies, and these actual values are preprocessed by filtering, for example by establishing a mean, or with a low pass filter. The resulting actual values obtained in this way are subsequently transmitted via a serial interface to the sequential electronic device at the demand clock pulse.

There are several possibilities for achieving an exact chronological correlation with the internal clock pulses of the sequential electronic device:

- a continuous clock signal is emitted by the sequential electronic device, whose frequency corresponds to the scanning clock pulse or whose frequency differs therefrom, wherein in case of a deviation a frequency multiplication or a frequency division takes place, or
- with each demand clock pulse, a clock pulse which is internal to the measuring device, for example a quartz or a PLL circuit, is synchronized, and the oversampling process in the position measuring device is controlled within a clock pulse cycle of the sequential electronic device preset in the sequential electronic device, or
- the scanning clock pulse is obtained by recovering the clock pulse in the position measuring device from a data flow of the sequential electronic device.

For determining the actual position or acceleration values, A/D converters are controlled at the scanning clock pulse for transmitting the measured values.

The sequential electronic device is in particular a drive regulating device with an internal regulation clock pulse, from which the demand clock pulse is derived. The scanning clock pulse is synchronized with this demand clock pulse, and therefore with the regulation clock pulse.

A reduced number of signal lines between the position measuring device and the sequential electronic device can be realized by the present invention. Six signal lines or less are sufficient, namely two for the clock pulse, two for the voltage supply and two for the measured values (data). The clock pulse can also be transmitted over the lines for voltage supply.

If in position measuring devices it is desired to utilize actual acceleration values from acceleration sensors which are integrated or installed in the vicinity, and to oversample them, too, the number of signal lines is not increased by this, since these data can also be serially transmitted over the data line. Parameterization of oversampling, for example the number of the scanning times for the actual values in comparison with the transmission clock cycle or the regulating cycle, the filter type, the filter parameters, can be set from the sequential electronic device via the bidirectional interface.

The present invention will be explained in greater detail in what follows by exemplary embodiments represented in the drawings.

Shown are in:

DESCRIPTION OF THE PREFERRED EMBODIMENT(S) OF THE INVENTION

Figure 1:
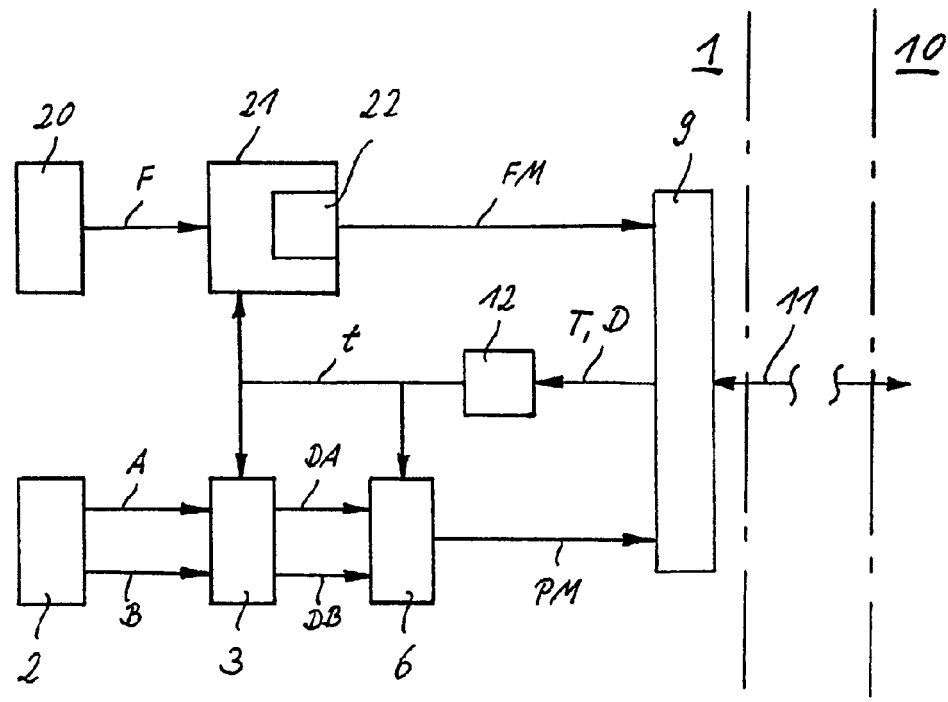
FIG. 1 shows an embodiment of position measuring device in accordance with the present invention.

The position measuring device 1 represented in FIG. 1 includes a detector unit 2, to whose output several analog scanning signals A, B, which are phase-shifted by 90° with respect to each other, have been applied. Such a detector unit 2 is known per se, wherein the scanning signals A, B are generated by opto-electrical, magnetic, inductive or capacitive scanning of an incremental graduation, or are derived from an interferometer. As a rule, the scanning signals A, B are sinusoidal.

Figure 2:
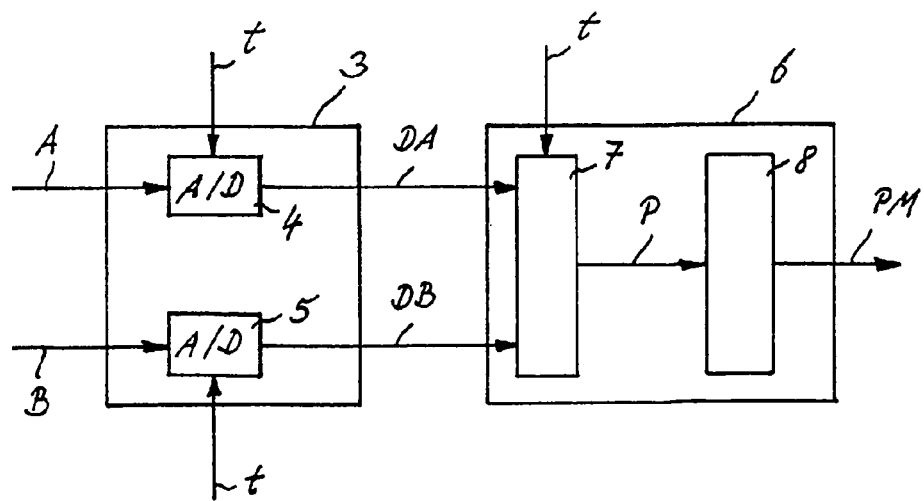
FIG. 2 shows an embodiment of a processing unit of the position measuring device in accordance with FIG. 1.

The scanning signals A, B are supplied to a transmitting unit 3, which takes on (samples) the instantaneous values of the scanning signals A, B synchronously at a predetermined scanning clock pulse t and digitizes them. As represented in FIG. 2, take-over and digitizing are realized by A/D converters 4 and 5.

The synchronously transmitted value pairs of the digitized scanning signals DA, DB are supplied to a processing unit 6, in which a resulting position measuring value PM is established from several such value pairs.

An exemplary embodiment of the processing unit 6 is represented in FIG. 2. It includes an interpolation unit 7, in which an interpolation value P, i.e. a measured position value within one signal period of the analogous scanning signals A, B, is established with each scanning clock pulse t from each value pair of the digital scanning signals DA, DB. This interpolation takes place in a manner known per se, for example with the aid of a table or an arctan calculation.

A filter 8, which is supplied with interpolation values P assigned to the individual scanning clock pulses t, is connected downstream of the interpolation unit 7. From a plurality of sequential interpolation values P, the filter 8 establishes the resulting measured position value PM. The function of the filter 8 is, for example, the establishment of a mean value from successive interpolation values P within two transmission or demand clock pulses T. However, the filter 8 can also be a low pass filter for establishing a common resulting position value PM from several successive interpolation values P. The filter 8 preferably is a digital filter in the form of a first or second order delay member, or an FIR or IIR filter. These filters provide a weighted mean value establishment, wherein the last scanned measured values are weighted higher than the previous measured values. This resultant measured position value PM is transmitted to an electronic follow-up device 10 upon request by the position measuring device 1. This request takes place as a result of a transmission clock cycle T previously supplied by the sequential electronic device 10 to the bidirectional serial interface 9 of the position measuring device 1.

There are several possibilities for achieving the exact chronological relation of the transmission clock cycle T to the scanning clock cycle t for the position values, or—as will be explained later—for the acceleration values in the measuring device 1, i.e. to assure synchronization.

The first possibility is that a continuous clock cycle signal t is transmitted from the sequential electronic device 10 to the position measuring device 1 via a serial data line 11. This clock cycle t corresponds to the clock cycle signal t. A clock generator 12 in the form of a counter is located in the position measuring device 1 which, after a predetermined number of clock pulses t, generates a transmission clock pulse T and causes the transmission of the resulting measured position value PM, which is established from a number of successive interpolation values P corresponding to the predetermined number of clock pulses t within one clock pulse cycle of the transmission clock cycle T.

Alternatively, the transmission clock pulse T is transmitted in a distinguishable manner from the sequential electronic device to the position measuring device 1 in addition to the scanning clock pulses t, or the transmission clock pulse T is transmitted on the data line 11, and the scanning clock pulse t on a separate clock pulse line from the sequential electronic device to the position measuring device 1. In both cases the synchronization of both clock pulses t and T is assured, since both have been derived from the internal clock pulse of the sequential electronic device, in particular from the regulating clock pulse of the drive regulating device.

A further possibility for synchronizing the clock pulses T and t consists in that only the transmission clock pulses T are transmitted from the sequential electronic device 10 to the position measuring device 1, and that the clock generator 12 divides this clock pulse T into the scanning clock pulse t.

Figure 3:
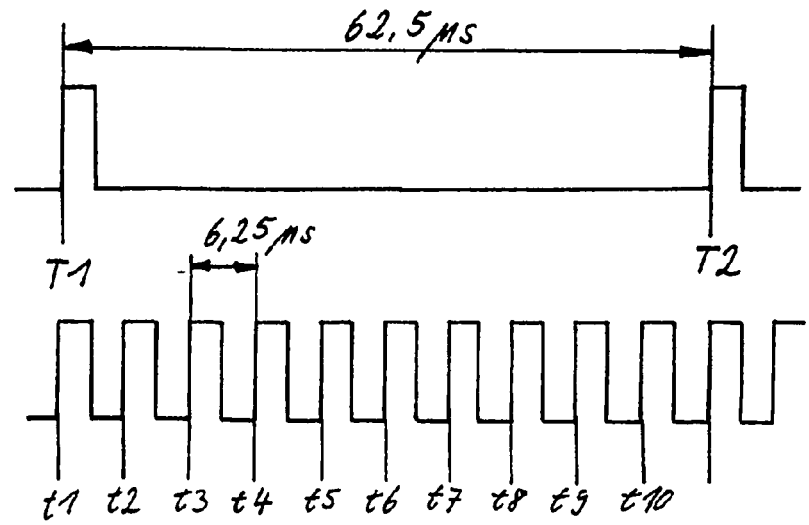
FIG. 3 shows a possible signal diagram for the position measuring device of FIG. 1.

This possibility is explained by the signal diagrams in FIG. 3. Here, the transmission clock pulse T transmitted by the sequential electronic device 10 to the position measuring device 1 is divided into scanning clock pulses $t_1$ to $t_{10}$. This frequency multiplication is performed, for example, by a PLL circuit (phase locked loop), wherein the oversampling method is only activated after the PLL has successfully settled. At the time T2, a measured position value PM resulting from the ten interpolation values P assigned to the times $t_1$ to $t_{10}$ is serially transmitted as a multi-digit code word from the position measuring device 1 to the sequential electronic device 10. The clock pulse cycle of the clock pulse T is 62.5 µsec, for example, and the clock pulse cycle t is 6.25 µsec.

Figure 4:
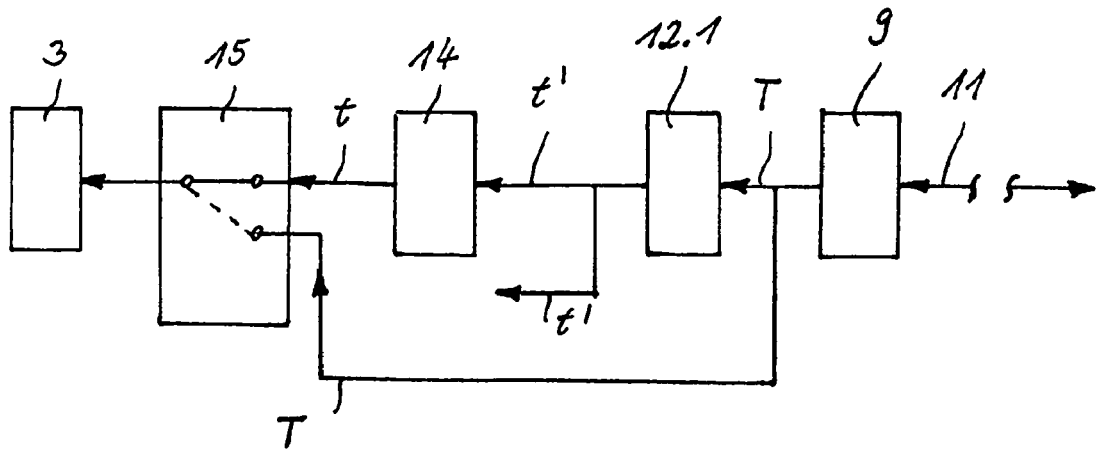
FIG. 4 schematically shows and embodiment of a circuit arrangement for obtaining a scanning clock pulse from a demand clock pulse.

A circuit example with a PLL circuit 12.1 is represented in FIG. 4. The demand clock pulse T transmitted via the serial data line 11 arrives via the interface 9 at the position measuring device 1 and is supplied to the PLL circuit 12.1. The PLL circuit 12.1 generates, synchronized with the demand clock pulse T, the scanning clock pulse t directly or, as represented in the example, an internal clock pulse t' required for the internal operation of the position measuring device, by which an internal processor in particular is clocked. This internal clock pulse t' is converted into the scanning pulse t by a frequency divider 14. Following its start-up, the PLL circuit 12.1 requires a certain amount of time until synchronization is assured. It is therefore advantageous if the transfer of the measured value in the demand clock pulse T takes place via a logic device 15, and a transfer to the scanning clock pulse t by the logic device 15 only takes place after the PLL circuit has successfully settled. The demand clock pulse T has, for example, a frequency fT of 20 kHz, in that case the frequency of the internal clock pulse t' is Ft'=FT/M*N, and the frequency of the scanning clock pulse t is Ft=FT/N, wherein N and M are whole numbers and greater than zero. Thus, N and M are parameters which fix the number of scanning clock pulses t within two transmission clock pulses T, and which can be transmitted via the serial data line 11 from the sequential electronic device 10 to the position measuring device 1 and stored there.

Figure 5:
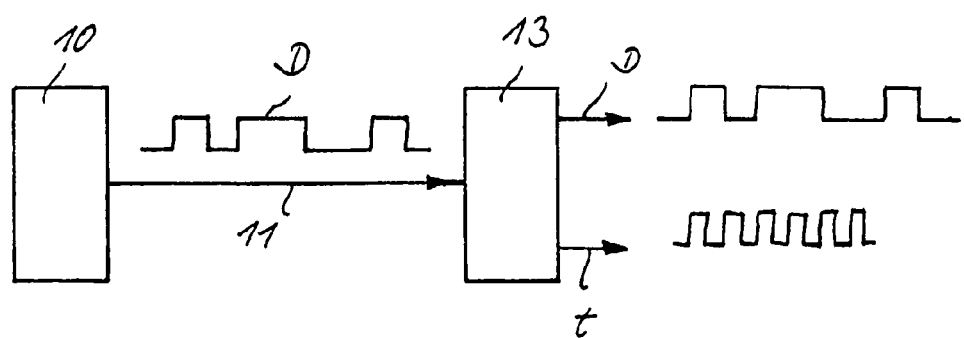
FIG. 5 schematically shows a principle for clock pulse recovery in the position measuring device of FIG. 1 in accordance with the present invention.

A further particularly advantageous possibility for synchronization between the sequential electronic device 10 and the position measuring device 1 lies in that the scanning clock pulse t is generated from a data flow D of the sequential electronic device 10 by recovering the clock pulse in the position measuring device 1. This principle is represented in FIG. 5. Based on the signal edge change in the data flow D of the sequential electronic device 10, the base clock pulse on which this signal edge change is based is determined in the module 13. The scanning clock pulse t is generated from this base clock pulse. Since this base clock pulse is derived from the regulating clock pulse of the sequential electronic device (drive regulation), the synchronization with the regulating clock pulse is assured.

Figure 6:
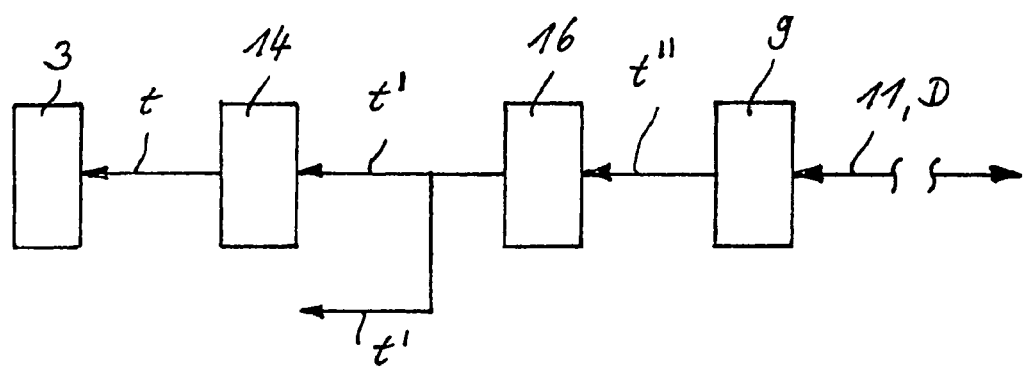
FIG. 6 schematically shows an embodiment of a circuit arrangement for clock pulse recovery for the position measuring device of FIG. 1 in accordance with the present invention.

A circuit example is represented in FIG. 6, in which the internal clock pulse t' is generated from the base clock pulse t" of the data flow D by the frequency converter 16. Then the scanning clock pulse t is obtained from this internal clock pulse t' by the frequency divider 14.

Figure 7:
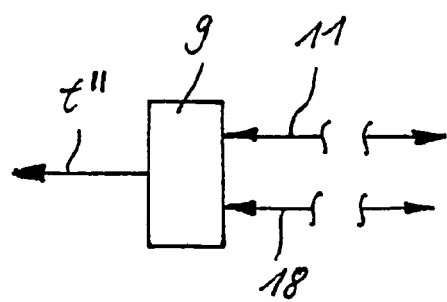
FIG. 7 schematically shows an embodiment of a circuit arrangement with a separate clock pulse line for the position measuring device of FIG. 1 in accordance with the present invention.

This circuit can also be used in case a serial interface is employed in which, besides the data line 11—on which the data flow D is transmitted—the clock pulse t" is transmitted over a separate clock pulse line 18 from the sequential electronic device 10 to the position measuring device 1, as schematically represented in FIG. 7.

The interface 9 is a bidirectional serial interface, by which the parameterization of the position measuring device 1 is also possible. This parameterization includes, for example, of the fixing of the number of scanning clock pulses t within two successive transmission clock pulses T. This number can be transmitted via the data line 11 to the position measuring device 1 and stored there. A further parameterization consists of the setting of the filter type, i.e. the function or the filter parameters of the filter 8. Filtering and/or the number of scanning clock pulses t within two successive transmission clock pulses T can also be set as a function of the instantaneous velocity of the machine elements whose position is detected.

It is known from EP 0 661 543 A1 that in an advantageous manner a position measuring device 1 also detects and outputs acceleration, besides the position. For this purpose, an acceleration sensor which operates in accordance with the Ferraris principle is additionally assigned to the position measuring device 1, in particular is integrated into it. With such an arrangement the invention can also be advantageously employed, as schematically represented in FIG. 1. An acceleration sensor 20 detects the acceleration of the object whose position is measured in accordance with the above description. The measured acceleration values F are supplied in the scanning clock pulse t to a processing unit 21, the processing unit 21 in turn contains a filter 22, which combines several successive instantaneous measured values F of the acceleration into a resultant acceleration value FM, which is then transmitted with the transmission clock pulse T to the sequential electronic device 10. The number of acceleration values F combined with each other in turn corresponds to the number of scanning clock pulses t between two successive transmission clock pulses T. For example, the function of the filter 22 is the establishment of a mean value, or the filter 22 is a digital filter in the form of a first or second order delay member, which causes a weighted mean value establishment. The resulting acceleration value FM is serially transmitted via the interface 9 on the serial data line 11, for example following the transmission of the resulting measured position value PM, so that, after every request by the sequential electronic device 10, a serial data flow is transmitted, including a serial code word defining the resulting measured position value PM, and a serial code word defining the resulting acceleration value FM.

The number of scanning clock pulses t between two transmission clock pulses T for establishing a resulting measured position value PM can be different from the scanning clock pulses t for establishing a resulting measured acceleration value FM. The number of scanning clock pulses t, or the filter parameters, can be selected for both measured values P, F as a function of the moved object, and adaptively set.

Further embodiment variations of the method in accordance with the present invention of course exist besides the explained example.

I claim:

1. A method for determining a position in a position measuring device, the method comprising:
generating position-dependent scanning signals by a detector unit of a position measuring device;
sampling instantaneous values of said scanning signals in a preset scanning clock pulse;
establishing a position value assigned to said scanning clock pulse from said sampled instantaneous values of said scanning signals;
establishing a resulting measured position value from said established position value and one or more other established position values, which are consecutive with said established position value and one another, by filtering; and serially transmitting said resulting measured position value to a sequential electronic device.

2. The method in accordance with claim 1, wherein said position-dependent scanning signals are sinusoidal analog signals, which are phase-shifted with respect to each other, the method further comprising:

digitizing each one of said position-dependent scanning signals during said scanning clock pulse to generate digital values for each one of said position-dependent scanning signals; and establishing said position value from said digital values which are phase-shifted with respect to each other.

3. The method in accordance with claim 2, wherein said serial transmitting is triggered by a transmission clock pulse, and wherein said transmission clock pulse and said scanning clock pulse are synchronized by a regulating pulse generated by a drive regulator of said sequential electronic device.

4. The method in accordance with claim 1, wherein said serial transmitting is triggered by a transmission clock pulse, and wherein said transmission clock pulse and said scanning clock pulse are synchronized by a regulating pulse generated by a drive regulator of said sequential electronic device.

5. The method in accordance with claim 4, wherein said scanning clock pulse is transmitted from said sequential electronic device to said position measuring device.

6. The method in accordance with claim 5, wherein a number of scanning clock pulses within said transmission clock pulse and a successive transmission clock pulse is set by parameters that are transmitted to said position measuring device from said sequential electronic device.

7. The method in accordance with claim 5, wherein a number of scanning clock pulses within said transmission clock pulse and a successive transmission clock pulse is set as a function of velocity.

8. The method in accordance with claim 4, wherein said scanning clock pulse is obtained via clock pulse recovery from a data flow of said sequential electronic device in said position measuring device.

9. The method in accordance with claim 4, wherein said scanning clock pulse is generated in said position measuring device and is synchronized with a clock pulse made available by said sequential electronic device.

10. The method in accordance with claim 4, further comprising:

generating an acceleration-dependent scanning signal an acceleration sensor;

sampling an instantaneous value of said acceleration-dependent scanning signal in a preset scanning clock pulse;

establishing a resulting acceleration from said instantaneous value and one or more other instantaneous values of said acceleration by filtering; and serially transmitting said resulting acceleration to said sequential electronic device.

11. The method in accordance with claim 4, wherein said filtering is set by parameters that are transmitted to said position measuring device from said sequential electronic device.

12. The method in accordance with claim 4, wherein said filtering is set as a function of velocity.

13. A position measuring device, comprising:

a detector unit that generates position-dependent scanning signals;

a sampling unit that samples instantaneous values of said position-dependent scanning signals in a preset scanning clock pulse;

a processing unit that establishes by filtering; a resulting measured position value by filtering instantaneous values of several scanning clock pulses, wherein said filtered instantaneous values of said several scanning clock pulses are consecutive relative to one another; and an interface which, on the basis of a transmission clock pulse transmits said resulting measured position value to a sequential electronic unit via a serial data line.

14. The position measuring device in accordance with claim 13, wherein said sampling unit comprises an A/D converter that generates digitized scanning signals from said scanning signals; and wherein said processing unit comprises:

an interpolation unit that establishes position values assigned to said scanning clock pulse from said digitized scanning signals; and a filter that establishes said resulting measured position value from position values assigned to said scanning clock pulse.

15. The position measuring device in accordance with claim 13, further comprising a clock generator that generates said scanning clock pulse, synchronized with a clock pulse made available by said sequential electronic unit.

16. The position measuring device in accordance with claim 15, wherein said clock generator is a module that recovers said scanning clock pulse from a data flow present at said position measuring device.

17. The position measuring device in accordance with claim 13, further comprising an acceleration sensor that generates an acceleration-dependent scanning signal, and said acceleration-dependent scanning signal is supplied to a processing unit for establishing a resulting acceleration value that is transmitted via said serial data line.

* * * * *